Jan. 30, 1951     C. E. NYBERG     2,539,922

SPECTACLE NECK SUPPORT

Filed April 19, 1949

Inventor
Curt E. Nyberg
B. Gordon Aller Atty.

Patented Jan. 30, 1951

2,539,922

UNITED STATES PATENT OFFICE 2,539,922

SPECTACLE NECK SUPPORT

Curt E. Nyberg, Chicago, Ill., assignor to Eye Glass Products, Inc., Chicago, Ill., a corporation of Illinois Application April 19, 1949, Serial No. 88,288

1 Claim. (Cl. 88—51)

This invention relates to a spectacle neck support, and more particularly to a novel retainer having means for connection to the temple pieces and adapted to pass behind the wearer's neck to afford support for the spectacles when not in use by the wearer.

Retainers of this type have generally been expensive and incapable of long life in service, and accordingly a primary object of the present invention is to devise such a retainer wherein the parts are economically manufactured and assembled to afford a rugged and sturdy construction having long wearing qualities.

A further object of the invention is to provide resilient retainer cups or tubes adapted to snugly fit over and grip the ends of the temple pieces to connect the retainer thereto.

Another object of the invention is to afford readily removable connections between gripping cups or tubes and the retainer strap to accommodate removal and replacement of the tubes as may be required for renewal or for adjustment where the wearer desires to utilize different tubes for gripping various shaped temple pieces of different spectacle frames.

Still another object of the invention is to provide novel ferrules or connectors interlocked with the ends of the retainer strap or cord and adapted to afford removable connection to the gripping tubes for the purposes above described.

The foregoing and other objects and advantages of the invention will become apparent from a consideration of the following specification and the accompanying drawings, wherein.

Figure 1:
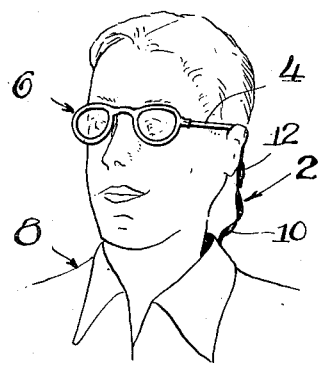
Fig. 1 is a front view of a person wearing a pair of spectacles to which the novel retainer is attached.
Figure 2:
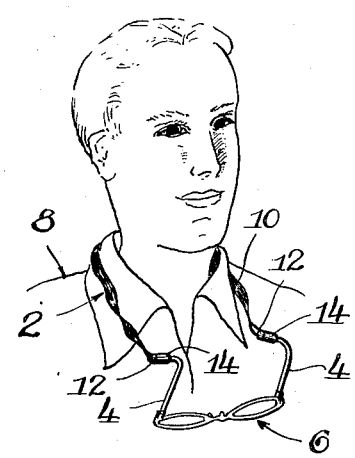
Fig. 2 is another front view of the person shown in Fig. 1, with the spectacles held in inoperative position by the novel retainer.

Describing the invention in detail and referring first to Figs. 1 and 2, the novel retainer generally designated 2 is shown as applied to the temple piece 4 of a pair of spectacles 6, the spectacles being worn by the user 8 in Fig. 1 and being held in inoperative position on the user's neck in Fig. 2, as for example in the case of a pair of sun glasses when the user is in a shaded area.

Figure 3:
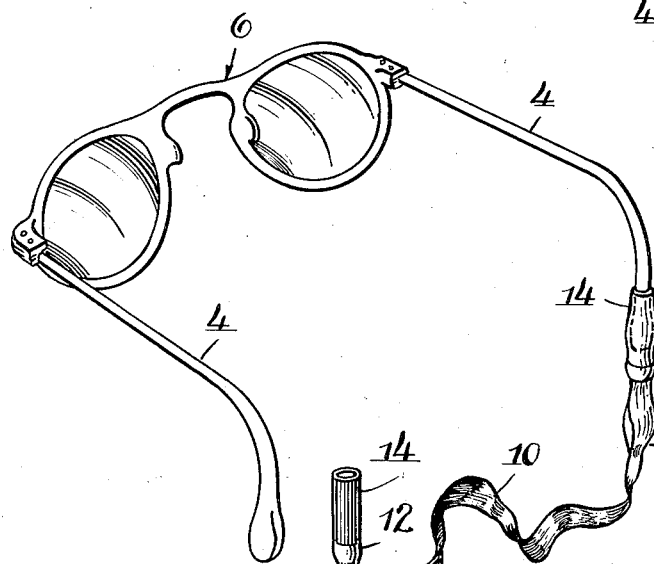
Fig. 3 is an enlarged perspective view of the spectacles and retainer with one gripping tube thereof engaging one temple piece of the spectacles and the other gripping tube removed from the other temple piece.

Fig. 3 is an enlarged view showing the retainer 2 in detail, and it will be seen that this device comprises a strap, ribbon, cord or other flexible connector 10 secured at its ends to ferrules 12 which are tightly sleeved within rubber tubes 14, the free ends of which are adapted to function as gripping tubes or cups for the ends or terminals of the temple pieces 4 of the spectacles 6.

Figure 4:
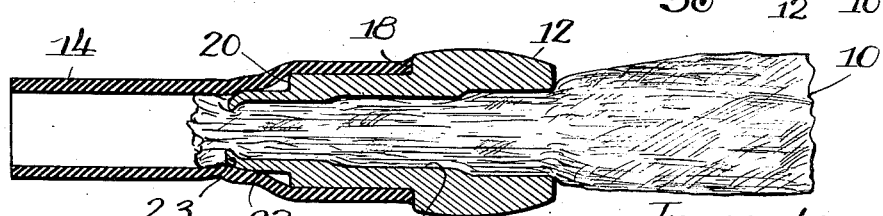
Fig. 4 is an axial sectional view through a ferrule and gripping tube showing the connection of the former to the tube and to the strap or cord of the retainer.

Fig. 4 shows the connection between one of the ferrules 12 and the flexible connector 10 and it will be seen that the ferrule is provided with a central opening 16 for reception of the connector 10 which is illustrated in the form of a strap or ribbon. The external surface of the ferrule is stepped to afford a step or shoulder 18 adapted to seat one end of the tube 14 and another step 20 over which the tube 14 is tightly drawn to afford tight and removable connection between the tube 14 and ferrule 12.

As best seen in Fig. 4, the end of the smallest step 22 of the ferrule 12 is peened inwardly as at 23 to clamp the flexible connector 10, and it may be noted that the ferrules 12 are preferably formed of a readily deformable plastic or metal, so that the small ends 22 thereof may be peened over, as by a hot iron, to afford a permanent connection between the connector 10 and the ferrules 12 to which the tubes 14 are then removably applied.

In this connection it may be noted that various spectacles and sun glasses have temple pieces with terminals of various sizes, and thus the novel retainer 2 is particularly adapted to accommodate selective substitution of various gripping tubes 14 so that the device may be readily adapted to the particular spectacles or sun glasses to be used.

Figure 5:
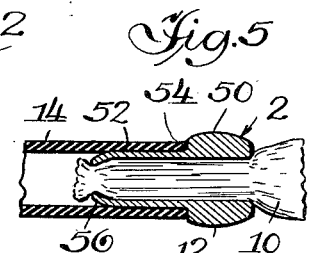
Fig. 5 is a view corresponding to Fig. 4 and showing a modified ferrule.

Fig. 5 also shows a modification wherein the ferrule 12 is formed with only two steps 50 and 52, the large step 50 affording a shoulder at 54 to seat the tube 14 and the small step 52 being relatively long so that the end thereof may be peened at 56 to clamp the connector 10.

It is to be understood that the above described embodiment of the invention is merely by way of illustration and that changes may be made in form and construction without departing from the spirit of the invention or sacrificing any of its advantages, and the right is hereby reserved to make all changes as fairly fall within the scope of the following claim.

What is claimed as new and desired to be secured by Letters Patent of the United States is as follows:

A spectacle retainer comprising a pair of ferrules having openings extending lengthwise therethrough, the external surfaces of said ferrules being stepped, a flexible connector extending through said openings, said ferrules having their smallest steps peened inwardly at their ends to clamp said connector and having their largest steps formed with shoulders facing said ends, and a resilient tube tightly sleeved over each ferrule and seated against the related shoulder, said tubes having free ends extending lengthwise beyond the peened ends of said ferrules to afford gripping cups for associated temple piece terminals, said tubes being held in said ferrules entirely by their own tension, whereby they may be readily removed and replaced with tubes of different diameters.

CURT E. NYBERG.

REFERENCES CITED

The following references are of record in the file of this patent:

UNITED STATES PATENTS

| Number | Name | Date |
|---|---|---|
| 574,124 | Wainwright | Dec. 29, 1896 |
| 911,573 | Crooks | Feb. 9, 1909 |
| 1,819,738 | Daniels | Aug. 18, 1931 |
| 1,993,010 | La Rue | Mar. 5, 1935 |
| 2,481,946 | Pendleton | Sept. 13, 1949 |